(12) United States Patent
Gazzetta et al.

(10) Patent No.: US 7,240,214 B2
(45) Date of Patent: Jul. 3, 2007

(54) CENTRALLY CONTROLLABLE INSTANT MESSAGING SYSTEM

(75) Inventors: Marco Gazzetta, Los Altos, CA (US); Warren Wan, Sunnyvale, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 683 days.

(21) Appl. No.: 10/637,384

(22) Filed: Aug. 8, 2003

(65) Prior Publication Data

US 2004/0083297 A1    Apr. 29, 2004

Related U.S. Application Data

(60) Provisional application No. 60/421,524, filed on Oct. 25, 2002.

(51) Int. Cl.
*G06F 1/24* (2006.01)

(52) U.S. Cl. ............... 713/182; 713/189; 713/193; 713/168

(58) Field of Classification Search ........ 713/182, 713/189, 193, 168
See application file for complete search history.

(56) References Cited

U.S. PATENT DOCUMENTS

| | | |
|---|---|---|
| 2002/0065894 A1 | 5/2002 | Dalat et al. |
| 2002/0112152 A1 | 8/2002 | VanHeyningen et al. |

*Primary Examiner*—Thomas R. Peeso
(74) *Attorney, Agent, or Firm*—Morrison & Foerster LLP (57) ABSTRACT

A system providing real-time communication over an electronic communication network between two or more users includes a client application associated with each user, a first authentication application having authentication information for at least one user and associated with at least one of the client applications, and a messaging service application maintaining the connection status of all of the users. The first authentication application and the client applications associated with the first authentication application reside on a first private network in communication with a public network. A second authentication application associated with at least one of the client applications and having authentication information for at least one other user reside on a second private network in communication with public network. The authentication applications can receive authentication information from directory services of their private networks. Communication between the authentication applications and the messaging service application is preferably via a secure communications connection.

25 Claims, 6 Drawing Sheets

Registration Flow

CENTRALLY CONTROLLABLE INSTANT MESSAGING SYSTEM

CROSS-REFERENCES TO RELATED APPLICATIONS

This application claims priority to U.S. Provisional Patent Application No. 60/421,524, filed Oct. 25, 2002, which is incorporated herein by reference for all purposes.

BACKGROUND OF THE INVENTION

This invention is related in general to electronic communication and more specifically to a method, system, and software for facilitating real-time communications between two or more users.

Instant messaging software commonly used today. Instant messaging software allows users to exchange messages via an electronic communication network, including local-area networks and wide-area networks such as the Internet. Messages can be in the form of short text messages, data files, live voice and/or video, or any other information capable of being exchanged via an electronic network. Unlike e-mail, instant messages are generally expected to be received and processed by their recipients in real-time.

Currently, the majority of instant messaging software use is by consumers who use instant messaging for social purposes. However, an increasing number of businesses are incorporating instant messaging software into their enterprises. Businesses use instant messaging to reduce telecommunication costs across the organization, to increase personal productivity and efficiency, and to fill the communication gap between telephones and e-mail. Additionally, businesses can use instant messaging to provide an immediate, online "Presence" or "Status" that can be tied into other enterprise applications and services, such as customer support.

Instant messaging software is typically geared toward consumer use, and therefore lacks many additional features desirable for enterprise use. For example, typical instant messaging software lacks secure authentication, encrypted communication, and centralized configuration and integration with existing enterprise infrastructure. It is desirable to provide an instant messaging system tailored to enterprise use that rectifies these deficiencies and further provides additional benefits, such as the ability to interoperate with private instant messaging networks and one or more public instant messaging networks.

BRIEF SUMMARY OF THE INVENTION

An enterprise messaging system can connect users within an enterprise, between different enterprises, and/or with users of public instant messaging networks. In one exemplary enterprise messaging system, each enterprise has an independent authentication server used for authenticating its own users, which allows enterprises retain control over their own users. Even though there are many different authentication entities, there is only one service provider for the system, which enables communication between different enterprises and optionally public instant messaging networks. This arrangement forces the service provider to depend on each of the authentication servers to ensure integrity of the enterprise messaging system. If even one authentication server is compromised, then the security of the entire enterprise messaging system is at risk.

One aspect of the present invention is an authentication scheme in which protects the integrity of the enterprise messaging system. In an embodiment of the authentication scheme, a single service provider issues a token used to authenticate a user. The token is sent to the authentication server associated with the user's enterprise. If the authentication server successfully authenticates the user, the authentication server sends the token to the user. The user then returns the token to service provider when connecting to the enterprise messaging system. Because the service provider, not the authentication server, issues the token used for authentication, the service provider can verify the integrity of the authentication server. A compromised authentication server that issues counterfeit tokens will be detected by the service provider. Because the user receives the token from the authentication server, rather than directly from the service provider, the enterprise still has control over user authentication.

In an embodiment according to aspects of the present invention, a system for providing real-time communication over an electronic communication network between two or more users. In a embodiment, the system comprises a client application associated with each user. A first authentication application having authentication information for at least one user is associated with at least one of the client applications. In one embodiment, the first authentication application receives authentication information from a directory service for at least one user of the private network. A messaging service application maintains the connection status of the users.

In another embodiment, the first authentication application and the client applications associated with the first authentication application reside on a private network in communication with a public network. The messaging service application resides on the public network, and communication between the first authentication application and the messaging service application passes through a firewall. In a further embodiment, communication between the first authentication application and the messaging service application is via a secure communications connection.

In a further embodiment, the system includes a second authentication application associated with at least one of the client applications and having authentication information for at least one user. In this embodiment, the first authentication application and the client applications associated with the first authentication application reside on a first private network in communication with a public network, while the second authentication application and the client applications associated with the second authentication application reside on a second private network in communication with public network.

In yet another embodiment, the first authentication application includes an administration tool for configuring client applications residing on the private network. The administration tool configures the client applications to include a content panel for displaying information. Client applications retrieve the information for display by the content panel from a location on the private network specified by the administration tool.

DETAILED DESCRIPTION OF THE INVENTION

An embodiment of the present invention is an instant messaging system tailored to enterprise use. An embodiment of this enterprise instant messaging system allows enterprise users to communicate securely with fellow employees, as well as external parties, in real-time. This embodiment of the enterprise messenger allows users to quickly see whether coworkers or clients are online and ready to interact. User interaction provided by an embodiment of the enterprise messenger system includes the ability to send and receive text messages, data files, live voice and/or video. Enterprise messenger user interaction can occur as one-to-one messaging, or as a conference between two or more users.

Figure 5:
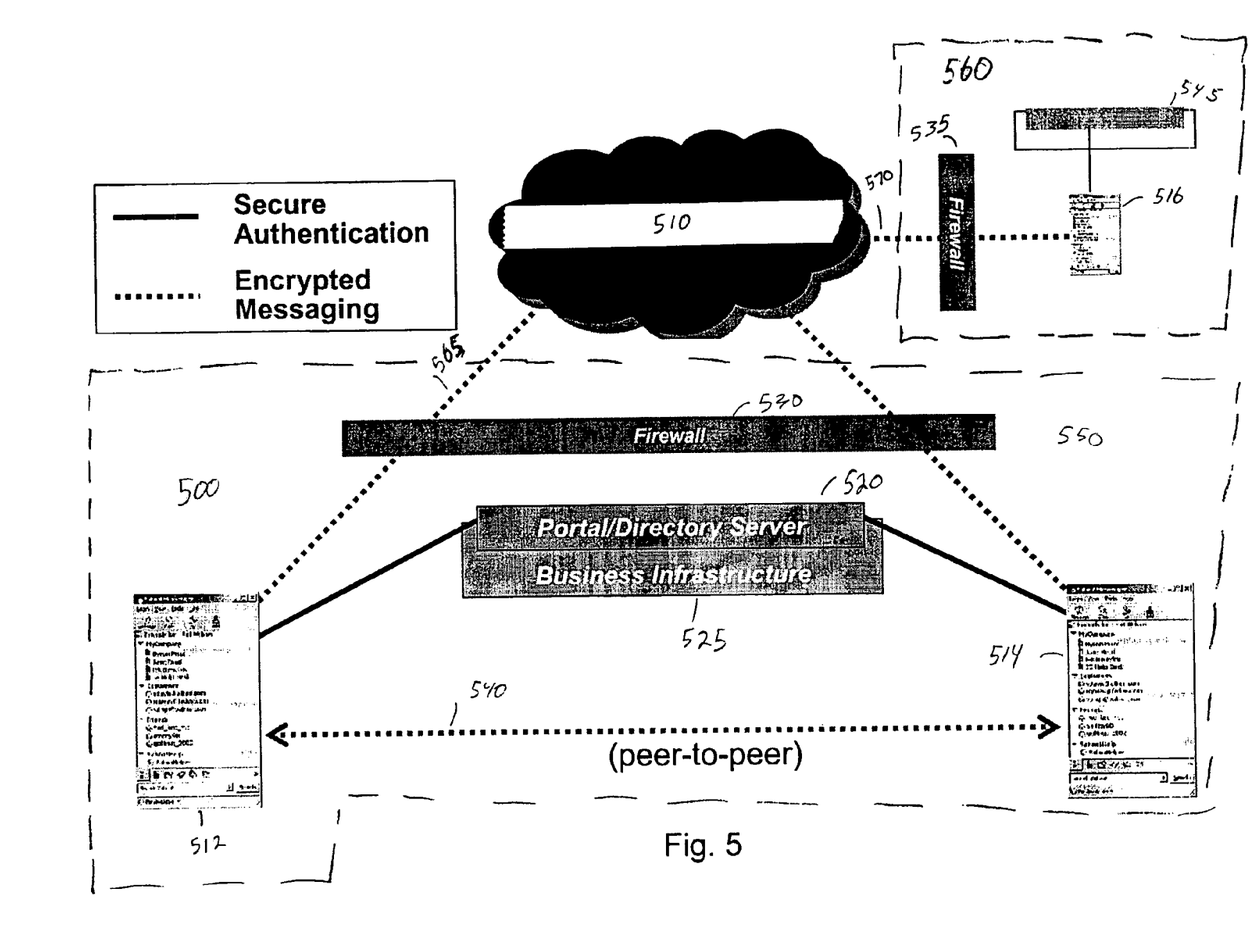
FIG. 5 shows an embodiment of an enterprise messenger system.

FIG. 5 illustrates an embodiment of the enterprise messenger system 500. The enterprise messenger system 500 includes a service provider 510 and messenger clients 512, 514, and 516. In an embodiment, the messenger client can be a software application running in conjunction with a web browser such as Microsoft Internet Explorer and an operating system such as Microsoft Windows 98/NT/2000. Each user of the enterprise messenger system 500 has at least one user identification. Users connect to the service provider 510 through a messenger client using their user identification. In an embodiment, the messenger client connects to the service provider 510 through a direct network socket connection. The service provider 510 maintains a list of all the users connected at any given time. When a user connects with the service provider 510, the service provider adds the associated user identification to the list of currently connected users. When a user disconnects with the service provider 510, the service provider removes the associated user identification from the list.

Each user may have a contact list containing the names and/or user identifications for frequently contacted users. When a user is connected with the service provider 510, the service provider 510 updates each user's contact list to indicate which users are currently connected to the service provider 510. In an embodiment, each user's contact list is associated with a user identification and stored on the service provider 510, so that users can access their contact list from any messenger client by connecting to the service provider with their user identification.

Users can communicate with each other while they are connected with the service provider 510. To initiate a communication between a group of users, the service provider 510 sends each messenger client the network addresses for other messenger clients in the group. The messenger clients then establish direct network connections with each other to communicate. This is illustrated by peer-to-peer connection 540 between messenger clients 512 and 514. Alternatively, the service provider 510 can service as an intermediary between messenger clients when a direct network connection cannot be established. This is illustrated by the indirect connections 565 and 570 between messenger clients 516 and 512, which must pass through service provider 510.

Firewalls 530 and 535 protect an enterprise's internal communication network and/or intranet from intrusion over the Internet. In an embodiment, messenger clients located behind the firewall connect with the service provider 510 and/or other messenger clients through an open network port.

A authentication server 520 provides authentication and other services for the enterprise messenger system 500. The authentication server 520 maintains a list of all of the users within an enterprise. In an embodiment, the authentication server 520 can be integrated with the enterprises' business infrastructure 525, for example, a directory service. In this embodiment, enterprise messenger system users within the enterprise can be added or deleted via the directory service. As discussed below, an additional embodiment of the authentication server 525 also performs local administration of portions of the enterprise messenger system.

In an embodiment, the authentication server 520 operates in conjunction with an operating system, such as Windows 2000 Server or Solaris; a web server application and servlet engine, such as IIS and JRun or iPlanet; and a Java Development Kit (JDK). The authentication server can be implemented in a number of different ways. In one embodiment, the authentication server 520 is integrated into an enterprise' intranet portal web site application. An example of an intranet portal web site application is the Yahoo! PortalBuilder 3.01 application. Alternatively, the authentication/messenger server 520 can be implemented as one or more stand-alone Java servlet applications.

The enterprise messaging system 500 can provide communication between users from many different enterprises. Each enterprise has its own authentication server. For example, enterprise 550 uses authentication server 520 and enterprise 560 uses authentication server 545. This allows each enterprise to independently control the addition and deletion of its users.

In an embodiment, a single service provider 510 operates in conjunction with a number of different authentication servers. By coordinating the messaging functions at a single service provider, this embodiment facilitates communication between messenger users within an enterprise, between users in different enterprises, and/or users on a public instant messaging network. For example, messenger client 512 can communicate with other messenger users within the same enterprise, such as the user associated with messenger client 514, as well as users within other, unrelated enterprises, such as the user associated with messenger client 516. In an embodiment, service provider 510 also handles messenger traffic for a consumer instant messaging network. In this embodiment, users on the enterprise messaging system 500 can also communicate with users on the public instant messaging network.

In addition to allowing interoperability between messenger clients in different enterprises, by separating the functions of the service provider 510 from each enterprise, the setup and maintenance for each enterprise greatly reduced. Since the actual messaging transactions are handled by the service provider 510, rather than the enterprise, there is no significant hardware or software to setup or maintain.

As discussed above, an embodiment of the authentication server 520 allows enterprise administrators to add or remove users within an enterprise. Each user in an enterprise, an enterprise user, is assigned a unique user identification, an enterprise ID. In an embodiment, enterprise users use their electronic mail address as their enterprise ID. For embodiments in which the enterprise messaging system includes enterprise users from multiple enterprises and/or users from public instant messaging networks, enterprise IDs can include a complete e-mail address, including the enterprise's domain name. In an embodiment, the enterprise ID can be up to 128 characters and may include letters, numbers, and the "@.-_" symbols. These attributes mirror those allowed for electronic mail addresses in many electronic mail systems. To guarantee the uniqueness of each enterprise ID in the enterprise messaging system, the "domain" portion of the enterprise ID, which is the portion following the "@" symbol, can be limited to an Internet domain owned by the enterprise.

Using an electronic mail address as the enterprise ID has the advantage of providing a single contact for a user via two different communication media (electronic mail and instant messaging). Additionally, the use of an electronic mail address as the enterprise ID facilitates integration and synchronization with an enterprise's existing directory infrastructure. For example, an enterprise's directory infrastructure can be used as the master source for user' electronic mail addresses, including any electronic mail address changes (e.g., when a user gets married and changes her name). A change to a user's electronic mail address automatically changes the user's enterprise ID.

Figure 1:
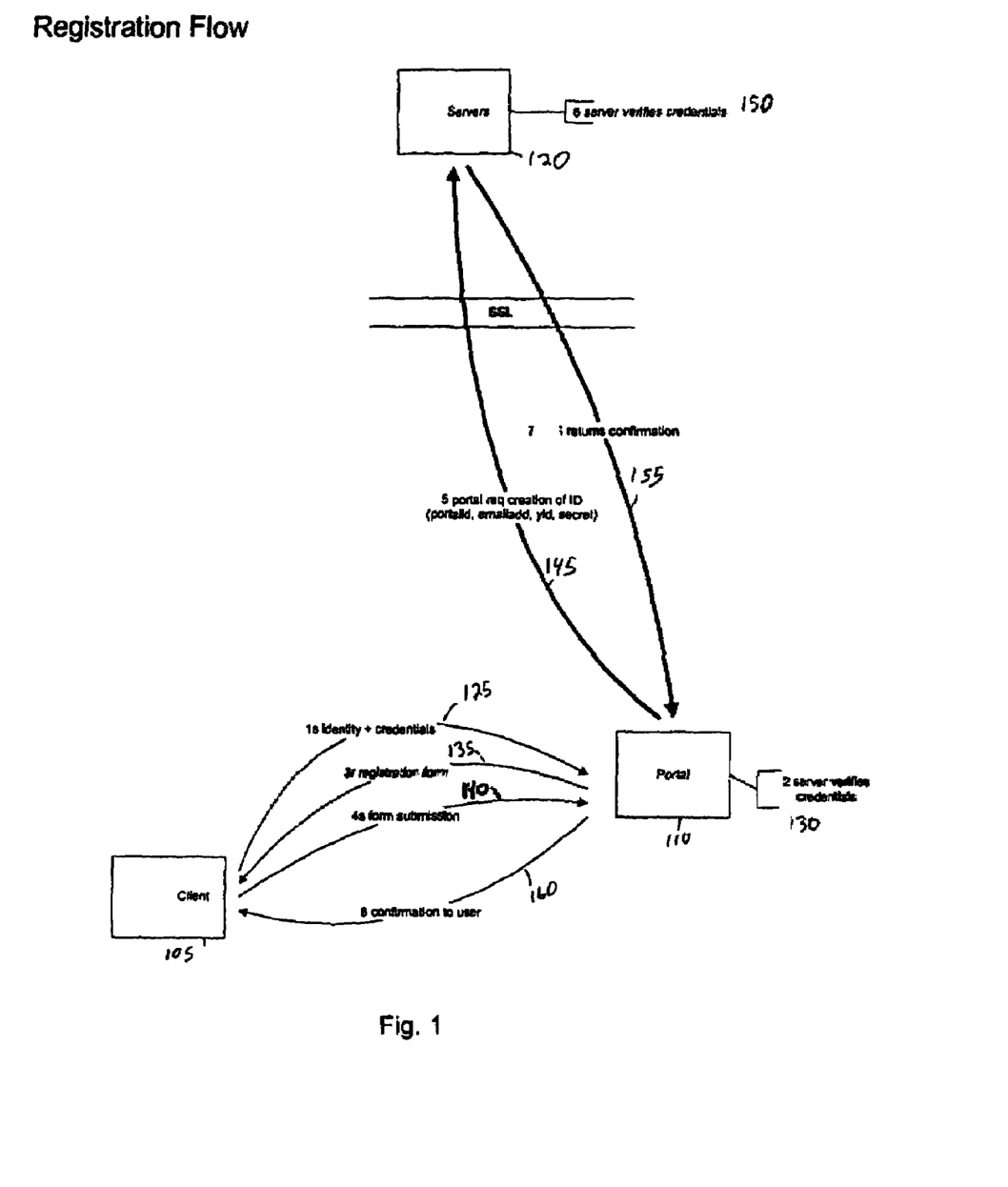
FIG. 1 shows an embodiment of the sequence of steps for registration of a user in an enterprise messenger system.

Once a user is assigned an enterprise ID, the enterprise ID is registered with the service provider. FIG. 1 illustrates some steps of assigning and registering a enterprise ID in an embodiment of an enterprise messenger system. At step 125, a messenger client 105 connects with a authentication server 110 to verify a user's identity. In embodiment, the messenger client presents enterprise authentication credentials, such as a user login and password, to the authentication server 110. At step 130, the authentication server 110 verifies the user's identity. In an embodiment, the authentication server checks the user credentials presented against credentials previously stored by the authentication server.

Once a user's identity has been verified, an embodiment of the invention presents a registration form to the user at step 135. The registration form allows the user to submit additional user information to be used by the enterprise messaging system. Examples of user information include a user's name and electronic mail address. As discussed above, the electronic mail address can be used as the user's enterprise ID. In an embodiment, a portion or all of the registration form is already filled in with user information automatically retrieved by the authentication server from the enterprise's directory infrastructure. In an alternate embodiment, step 135 is skipped.

In a further embodiment, the registration form allows the user to submit a public user ID previously created for use with a public instant messaging network. The submission of a public user ID allows a user's enterprise ID and public user ID to be linked together. The process is discussed in more detail below.

The user submits the completed registration form back to the authentication server at step 140. An embodiment of the invention uses HTML tags, such as the "FORM" tag, to perform steps 135 and 140. Using the information provided by the registration form, at step 145 the authentication server 110 forms a creation request and forwards the creation request to the service provider 120. In an embodiment, the creation request includes a unique authentication server ID to identify the authentication server to the service provider, an electronic mail address to be used as a user's enterprise ID, and, if provided by a user, a public user ID. In addition, the creation request can include a manual ID, which is used internally by the authentication server 110 and the service provider 120 to identify a user. The manual ID ensures that changes in a user's name or electronic mail address do not result in interruption of the user's access to the enterprise messaging system. In an embodiment, the manual ID is a user's enterprise login. In a more secure alternative embodiment, the manual ID is a value derived from the user's login, for example by a hashing function. This embodiment reduces the risk of a user's login information being intercepted or stolen from the service provider 120. In a further embodiment, the authentication server 110 communicates with the service provider 120 via a secure connection, such as a secure sockets layer (SSL) connection.

At step 150, the service provider 120 verifies the authentication server ID to ensure the authentication server 110 is authorized to use the service provider 120. If the authentication's credentials are valid, the service provider 120 adds the new user's enterprise ID and manual ID to its user database, and, when applicable, links these parameters to the user's previously created public user ID. In an embodiment where the user's enterprise ID corresponds to their electronic mail address, the service provider stores the enterprise IDs securely and does not include any enterprise IDs in publicly accessible directory. At step 155, the service provider 120 returns a confirmation of successful registration to the authentication server 110. This confirmation is recorded by the authentication server 110, and a confirmation is sent to the messenger client 105 at step 160.

Once an enterprise ID has been assigned to a user, the user can connect with the enterprise messaging service using a messenger client application. An authentication process is used to verify the user's identity when initiating a connection with the enterprise messaging system. Authentication is the exchange of user information between the messenger client, the authentication server, and the service provider for the purpose of login to the enterprise messaging service.

Authentication protects the integrity of the enterprise messaging systems and prevents malicious users from assuming the identity of other users. Authentication of users in an enterprise messaging system presents several unique security challenges. An enterprise messaging system can connect users from different enterprises. Each enterprise has its own independent authentication server, which is used to authenticate users within the enterprise. Even though there are many different authentication entities, there is only one service provider for the system. By allowing each enterprise to perform authentication on its own authentication, enterprises retain control over their own users. However, by using a single service provider, the enterprise messaging system enables communication between different enterprises and optionally public instant messaging networks. This arrangement forces the service provider to depend on each of the authentication servers to ensure integrity of the enterprise messaging system. If even one authentication server is compromised, then the security of the entire enterprise messaging system is at risk.

Figure 2:
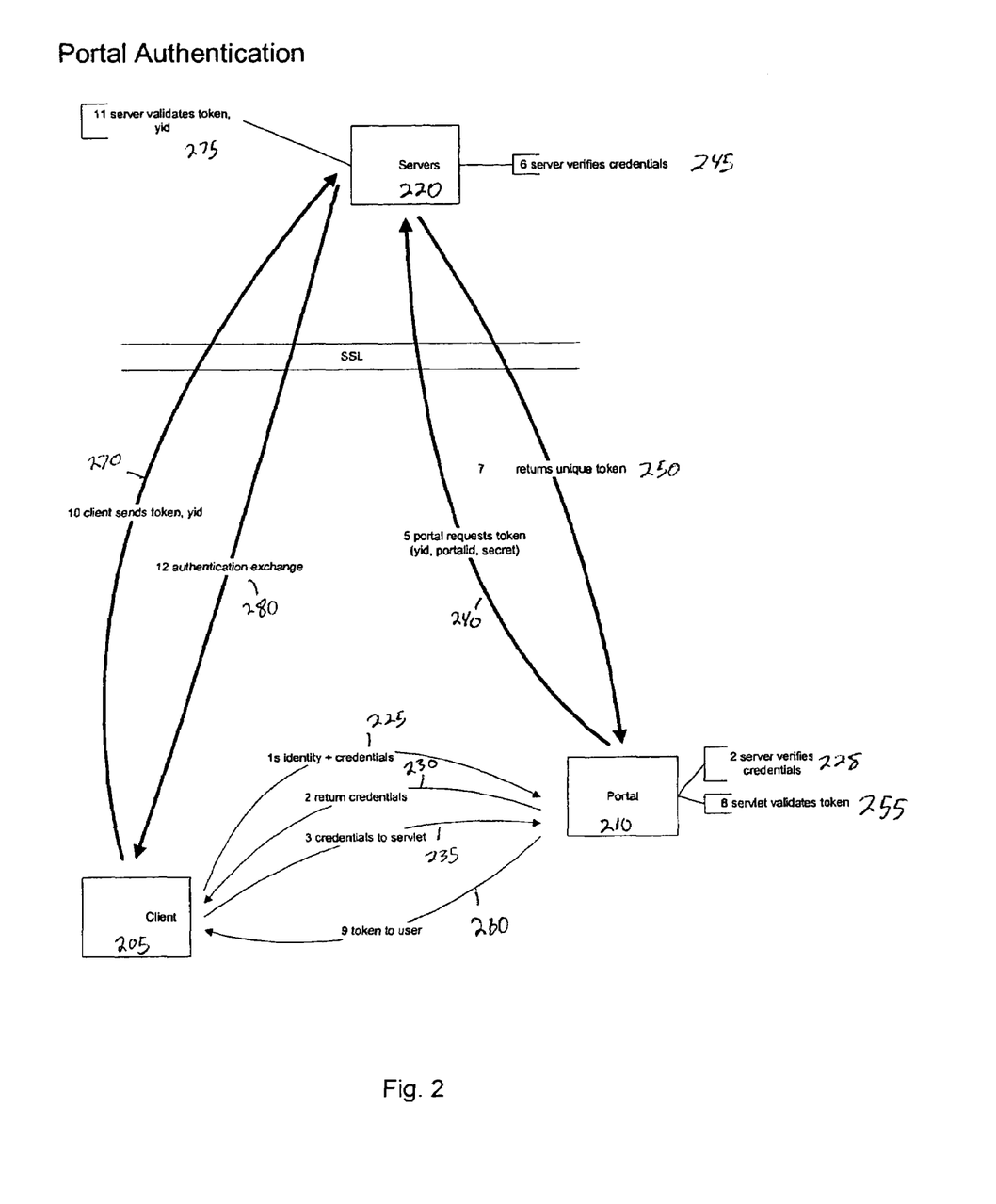
FIG. 2 shows an embodiment of the sequence of steps for user authentication in the an enterprise messenger system.

An embodiment of the present invention includes an authentication scheme designed to overcome this vulnerability. FIG. 2 illustrates an embodiment of this authentication scheme. In step 225 of this embodiment, a messenger client 205 connects to a authentication server 210 to verify the user identity. In an embodiment, the user identity is verified by presenting login and password credentials to the authentication server 210. Other approaches to verifying user identity may be used instead, such as smartcards, biometric identification, or token providers. At step 228, the authentication server 210 verifies the login credentials of the user. At step 230, the authentication server 210 returns credentials to the messenger client 205, which indicates that the messenger client 205 has successfully verified the user's identity with the authentication. In an embodiment, the credentials can be returned to the messenger client 205 as HTTP headers such as "Authorization" and "Cookie."

At step 235, the messenger client 205 uses its credentials to access an enterprise messenger authentication application. In an embodiment, the enterprise messenger authentication application is a servlet or other application residing on the authentication 210. The enterprise messenger authentication application forms an authentication request uses the user's enterprise ID, a authentication server ID, and a shared secret. The shared secret is a password or other phrase known in advance to both the enterprise messenger authentication and the service provider 220. At step 240, the authentication 210 sends the authentication request to the service provider 220. In an embodiment, a secure connection, for example a secure sockets layer (SSL) connection, is used for all communication to and from the service provider 220.

At step 245, the service provider 220 validates the authentication request. In an embodiment, the service provider 220 matches the enterprise ID against its user database to ensure it is a valid enterprise ID. The service provider 220 also matches the authentication server ID and the shared secret against its own database to verify the identity of the authentication server. Once the authentication request is validated, at step 250 the service provider returns a unique token to the authentication server 210. In an embodiment, the token includes an encoded form of the enterprise ID, the authentication ID, and a time stamp indicated the time when the token was created. In an alternate embodiment, this information is not directly encoded into the token. Instead, the token is a randomly assigned value. The enterprise ID, the authentication ID, the time stamp, and the token's randomly assigned value are stored by the service provider for future matching.

At step 255, the authentication server 210 validates the token. At step 260, the authentication server sends the token unmodified to the messenger client 205. Following the receipt of the token, at step 270 the messenger client establishes a direct connection with the service provider 220 and forwards the token back to the service provider. In an embodiment, a value that is the combination of the token and the user's enterprise ID are returned to the service provider 220. Alternatively, the token is returned to the service provider 220 unmodified. In a further embodiment, a second token validating the user's identity is also sent to the service provider. In another embodiment, a secure connection, for example a secure sockets layer (SSL) connection, is used for all communication to and from the service provider 220.

The service provider 220 validates the token received from the messenger client 205 at step 275. Because the service provider 220 created the token, the token may be validated by ensuring that the token has not been tampered with. In an embodiment, the service provider 220 decodes the token to extract an enterprise ID, a authentication ID, and a time stamp. These decoded values are then compared with the original values encoded in the token. The time stamp decoded from the token can be compared to time when the token is received by the service provider 220. An unusually long delay between these two times can indicate to the service provider that the token was intercepted or tampered with. In an alternate embodiment, the service provider 220 matches the received token against an enterprise ID, authentication ID, and time stamp previously stored in association with the token. Once the token has been validated by the service provider 220, at step 280 the service provider 220 connects the messenger client to the enterprise messaging systems. In an embodiment, this step includes adding the user to the service provider's list of connected users and updating the messenger client with the user's contact list, as discussed above.

Because the service provider, not the authentication server, issues the token used for authentication, in this embodiment of the authentication scheme, the service provider can verify the integrity of the authentication server. If the authentication server has been compromised and attempts to modify the token, the service provider will detect the tampering and will prevent that messenger client from connecting to the enterprise messaging system. Further, the messenger client receives the token from the authentication server, rather than directly from the service provider. This ensures that the messenger client has been authenticated by authentication server. In an additional embodiment, the authentication server is located behind an enterprise's firewall and cannot be accessed by messenger clients outside the enterprise. This embodiment prevents messenger clients outside the enterprise from accessing the enterprise messaging system using stolen login and password credentials.

Another advantage of this authentication scheme is that all contact between the service provider and the authentication server can be limited to communications initiated by the authentication server. Under such a scheme, the authentication server does not need a continuously open connection with the service provider. Instead, the firewall can be opened by the authentication server only for stateless outbound traffic. This protects the enterprise from outside attacks.

An additional feature of exemplary enterprise messaging systems allows users who are also registered with a public instant messaging system to link their enterprise ID with their public user ID. When a public user ID and an enterprise ID are linked together, the user's separate online identities are merged. When the user connects to either the enterprise messaging system or the public instant messaging system using a linked identity (either the public user ID or the enterprise ID, depending upon the system connected to), the user's public user ID and enterprise ID are connected to their respective systems. In a further embodiment, a user can connect to the public instant messaging system using either their public user ID or their enterprise ID. While connected, the user can communicate with other users on either system using the same messaging client. Thus, linking online identities allows users to access the enterprise messaging system from outside an enterprise's firewall without a direct network connection to the enterprise's authentication server. Additionally, the user's contact lists from each online identity are merged into a single list. If a duplicate contact appears on the two lists, the merged contact list will only show this contact once.

Figure 3:
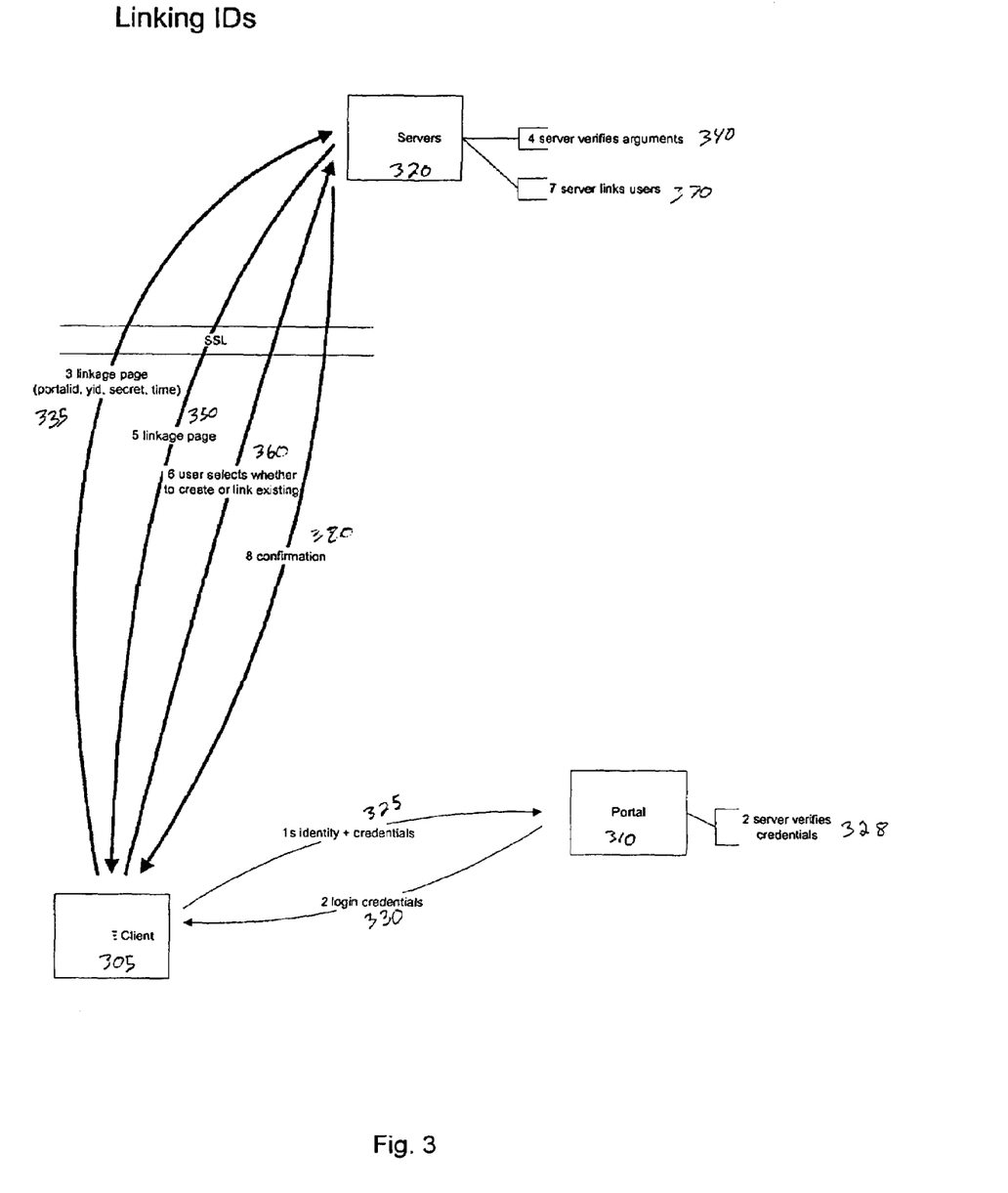
FIG. 3 shows an embodiment of the sequence of steps for linking identities of a user in an enterprise messenger system.

FIG. 3 illustrates an embodiment of a method to link an enterprise ID with a public user ID. At step 325, a messenger client 305 connects to a authentication server 310 to verify the user identity. In an embodiment, the user identity is verified by presenting login and password credentials to the authentication server 310. At step 328, the authentication server 310 verifies the login credentials of the user. At step 330, the authentication server 310 returns credentials to the messenger client 305, which indicates that the messenger client 305 has successfully verified the user's identity with the authentication. For security purposes, no linkage can occur without prior authentication to the authentication.

At step 335, the messenger client 305 is redirected by the authentication server 310 to the service provider 320. In an embodiment, the messenger client 305 initiates a connection with the service provider 320 by providing the service provider with the connection information such as the authentication ID, the enterprise ID, a shared secret, and a time stamp. At step 340, the service provider 320 validates the connection information. In an embodiment, the service provider 320 matches the enterprise ID against its user database to ensure it is a valid enterprise ID. The service provider 320 also matches the authentication server ID and the shared secret against its own database to verify the identity of the authentication server. The time stamp can be compared to time when the client requests the URL from the service provider 320. An unusually long delay between these two times can indicate to the service provider that the messenger client 305 has been compromised or tampered with.

Once the arguments in the URL have been validated, at step 350, the service provider 320 presents the messenger client 305 with a linkage page. The linkage page enables the user to select whether to link their enterprise ID and their public user ID when such a choice is available. In an embodiment, the user also has the option of creating a new public user ID, which will be linked to their enterprise ID. If the user chooses to link a new or pre-existing public ID with an enterprise ID, the linkage page prompts the user for the public user ID login name, and a password or other credentials. If a new public user ID is being created, the linkage page prompts the user for additional authentication information. At step 360, the linkage page with the user's public user ID information is returned to the service provider. Since a public user ID and password are sensitive information, all communication between the service provider 320 and the messenger client 305 should occur over a secure connection, such as a secure sockets layer (SSL) connection.

At step 370, the service provider 320 links the public user ID and the enterprise ID together. In an embodiment, the service provider 320 maintains a list of public user IDs and enterprise IDs. The list entry for each user includes the user's list of contacts. Additionally, each user entry includes a linkage flag. The linkage flag indicates whether the online identity is linked or not. The service provider 320 links online identities by retrieving the list entries associated with each of the online identities. For each list entry, the service provider 320 changes the linkage flag to indicate that the online identity is linked with another online identity. The service provider 320 adds a pointer or other reference to each of the list entries that identifies its linked counterpart. In an embodiment, the service provider 320 merges the contact lists from each list entry into a single contact list. After the contact lists have been merged, the service provider deletes the original contact lists to conserve storage space. At step 380, the service provider 320 informs the messenger client 305 that the two online identities have been successfully merged.

When the user connects with either the enterprise messaging system or the public instant messaging system, the service provider will retrieve the user's online identity from its list of users and add this online identity to its list of online users. In an embodiment, the service provider also adds connection information for the user's messenger client to this list, so that other messenger clients can connect with the user's messenger client. If a user's online identity includes a linkage flag and a reference to a second online identity, the service provider will retrieve the second online identity from its list of users and it to the list of online users.

In a further embodiment, users can unlink their online identities. When a user requests an unlinking, the service provider deletes the linkage flag and any references to other identities from the list entries of each online identity. In an additional embodiment, the service provider copies the merged contact list to each of the separated online identities.

An additional feature of the enterprise messaging system allows users to communicate securely. In an embodiment, the messaging among enterprise messaging system users using an enterprise messaging client is encrypted. For example, standard enterprise-level security (e.g., 128-bit encryption) can encrypt messages between users. In an embodiment, there is no encryption of voice, webcam, file exchanges or conferences to minimize the processing requirements of the enterprise messenger client. Alternately, any or all of these forms of messaging may be encrypted if the need arises.

In a further embodiment, the enterprise user can use a consumer messenger client to communicate over the enterprise messaging system, for example using a linked online identity as described above. Further, users of the enterprise messaging client can communicate insecurely with users of the consumer messaging client. Table 1, below, summarizes the use of secure and insecure communications with enterprise and consumer users according to an embodiment of the invention.

TABLE 1

| | Enterprise Messenger Client | Consumer Messenger Client |
|---|---|---|
| Enterprise User | Secure Messaging | Insecure Messaging |
| Consumer User | Insecure Messaging | Insecure Messaging |

In an embodiment, if an enterprise user tries to use an enterprise client for secure communication in a location where there is no access to the secure port designated for that service, they will not be allowed to log in and utilize the secure messaging capabilities. An additional embodiment notifies users that a secure connection cannot be established with the enterprise messaging system. Users will then be given the option to log into the public instant messaging system.

Encryption can be deployed for a variety of messaging communications. In an embodiment, encryption can be used for communication between enterprise messaging clients and enterprise authentication servers, communication between enterprise authentication servers and the service providers, and communication among enterprise messaging clients.

In an alternate embodiment, these requirements can be relaxed in the case of enterprise messaging client to authentication server interaction so that encryption is only required for a message part of the interaction, not for routing or presence information. Further, in this alternate embodiment, no encryption needs to be in place for messages between consumer messaging clients.

Figure 4:
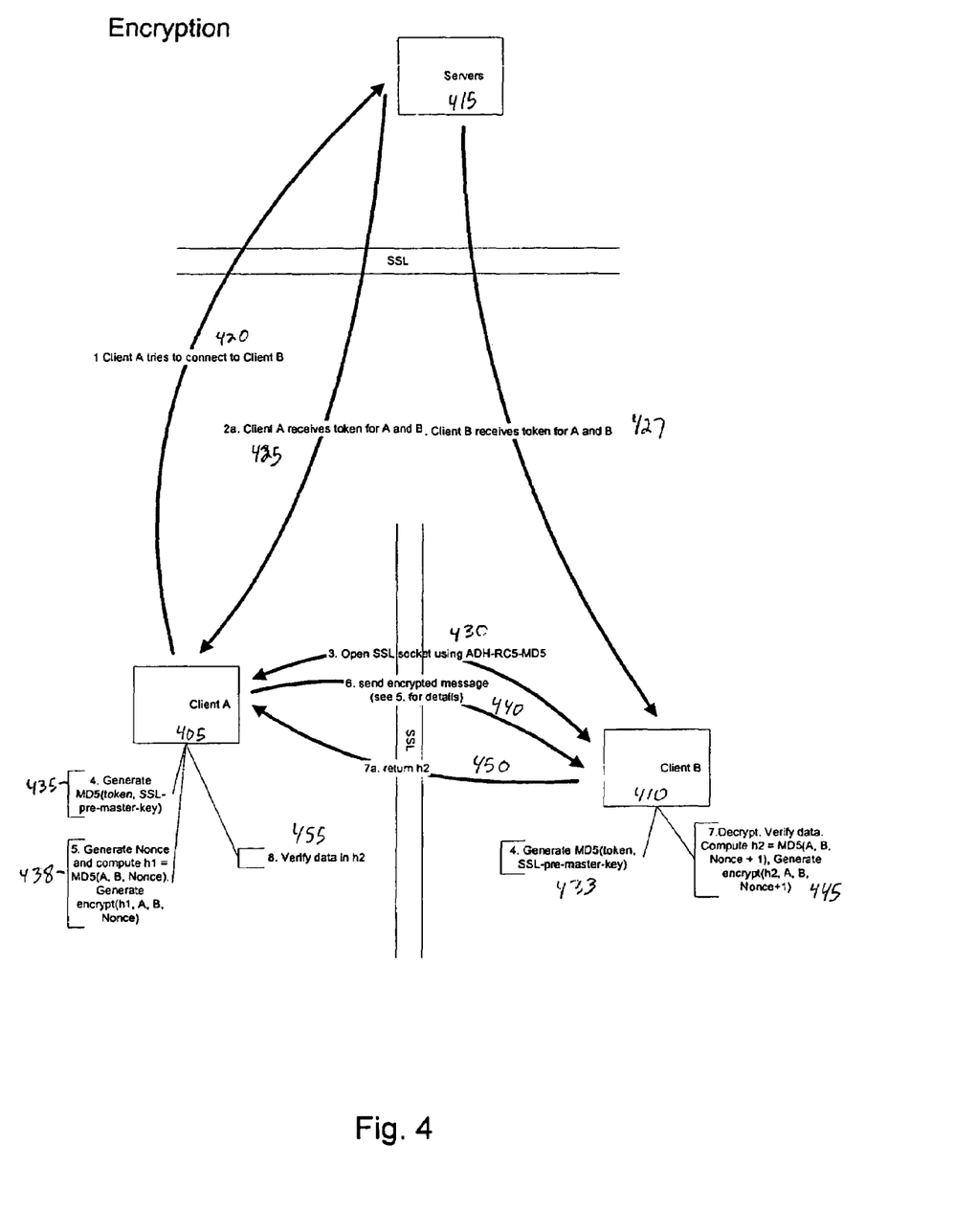
FIG. 4 shows an embodiment of the sequence of steps for encryption of messages of a user in an enterprise messenger system.

FIG. 4 illustrates a method of establishing a secure peer-to-peer connection between messaging clients according to an embodiment of the invention. In this embodiment, the messaging clients bypass the secure connection established with the service provider and connect with each other directly.

Following successful authentication, as described above, messaging client 405 initiates communication with messaging client 410 by sending a request to the service provider 415 at step 420. At steps 425 and 427, the service provider 415 sends a token, for example a 16 byte random or pseudorandom value, to clients 405 and 410. The service provider 415 further designates one of the clients to initiate the secure peer-to-peer connection. All communications between the service provider 415 and the clients 405 and 410 can use the secure connection previously established during authentication.

At step 430, the client designated by the service provider initiates a secure connection with the other client. In an embodiment, the secure connection can be an anonymous SSL socket using the ADH-RC4-MD5 cipher suite, also known as the anonymous Ephemeral Diffie-Hellman exchange. In this embodiment, no certificate verification is needed by either client. Once this secure connection is opened, the communications between clients 405 and 410 are protected from passive attackers; however, an active attacker could be proxying messenger communications between clients, for example, using a router.

To protect against active attackers, at steps 433 and 435, each client derives a key to prove their identity. In an embodiment, the key is a MD5 hash of the token provided in steps 425 and 427 and the SSL pre-master-key used to initiate the secure peer-to-peer connection in step 430. Additionally, at step 438, the initiating client generates a random value as a nonce. In an embodiment, the random value can be a 16-byte random or pseudorandom value. The initiating client computes a hash (H1) of the nonce, and an encrypted message (M1) from this hash. In an embodiment, the hash H1 equals MD5(Initiator-alias, Recipient-alias, Nonce). In an embodiment, the aliases are derived from the token sent from the service provider 415. For example, the token can be split in half to form the aliases. Further, M1, the encrypted message, equals Encrypt_Key(H1, Initiator-alias, Recipient-alias, Nonce), where Encrypt_Key is a function encrypting data using the key derived in steps 433 and 435. At step 440, the initiating client sends the encrypted message to the other client via the secure peer-to-peer connection.

At step 445, the receiving client decrypts the message and verifies that the Initiator-alias and Recipient-alias are as expected. The receiving client also decrypts the nonce generated by the other client. The receiving client then generates a second hash (H2). In an embodiment, H2 equals MD5(Initiator-alias, Recipient-alias, Nonce+1). Further, an encrypted reply message (M2) is generated. In an embodiment, M2 equals Encrypt_Key(H2, Initiator-alias, Recipient-alias, Nonce+1).

The encrypted message M2 is sent back to the initiating client at step 450. and sends Message_2 to the initiator. At step 455, the initiating client decrypts M2 and verifies that all the values are as expected (e.g. the initiator-alias and recipient-alias match the aliases, and the decrypted nonce equals the original nonce plus one). If all the values are as expected, the initiating client knows that the receiving client must know the token in order to decrypt and increment the nonce and keep the aliases and hashes straight.

With other methods of verifying identity, for example Kerberos, a recipient cannot be sure that the initiator's message is fresh, and is not a previously stored message being replayed. However, the encryption method described above uses a short-lived, ephemeral key. In order to pass this encryption by replaying an old message, the message would have to be used on the same pair of peer-to-peer clients using the same server provided secret and the same Ephemeral Diffie-Hellman (EDH) keys. The odds of this succeeding are very small given that the EDH keys and server secret are all randomly or pseudorandomly generated on demand. Thus, the recipient can be virtually certain that the messaging end point is the desired peer and not an impostor.

Additionally, since the key for peer-to-peer communication is derived from the SSL pre-master-secret, which is derived from an ephemeral Diffie-Hellman exchange, there can be only one Diffie-Hellman exchange. In the case where an attacker was in the middle proxying requests between messaging clients, each messaging client would derive different pre-master-secrets and therefore different keys, and the encrypted messages could not be deciphered by the recipients.

Alternatively, messaging clients can communicate with each other via their secure connections with the service provider. In this embodiment, following successful authentication, as discussed above, the messaging client continues sending all sensitive traffic over the SSL connection with the service provider previously established for authentication purposes. The service provider relays messaging traffic between the messaging clients.

Figure 6:
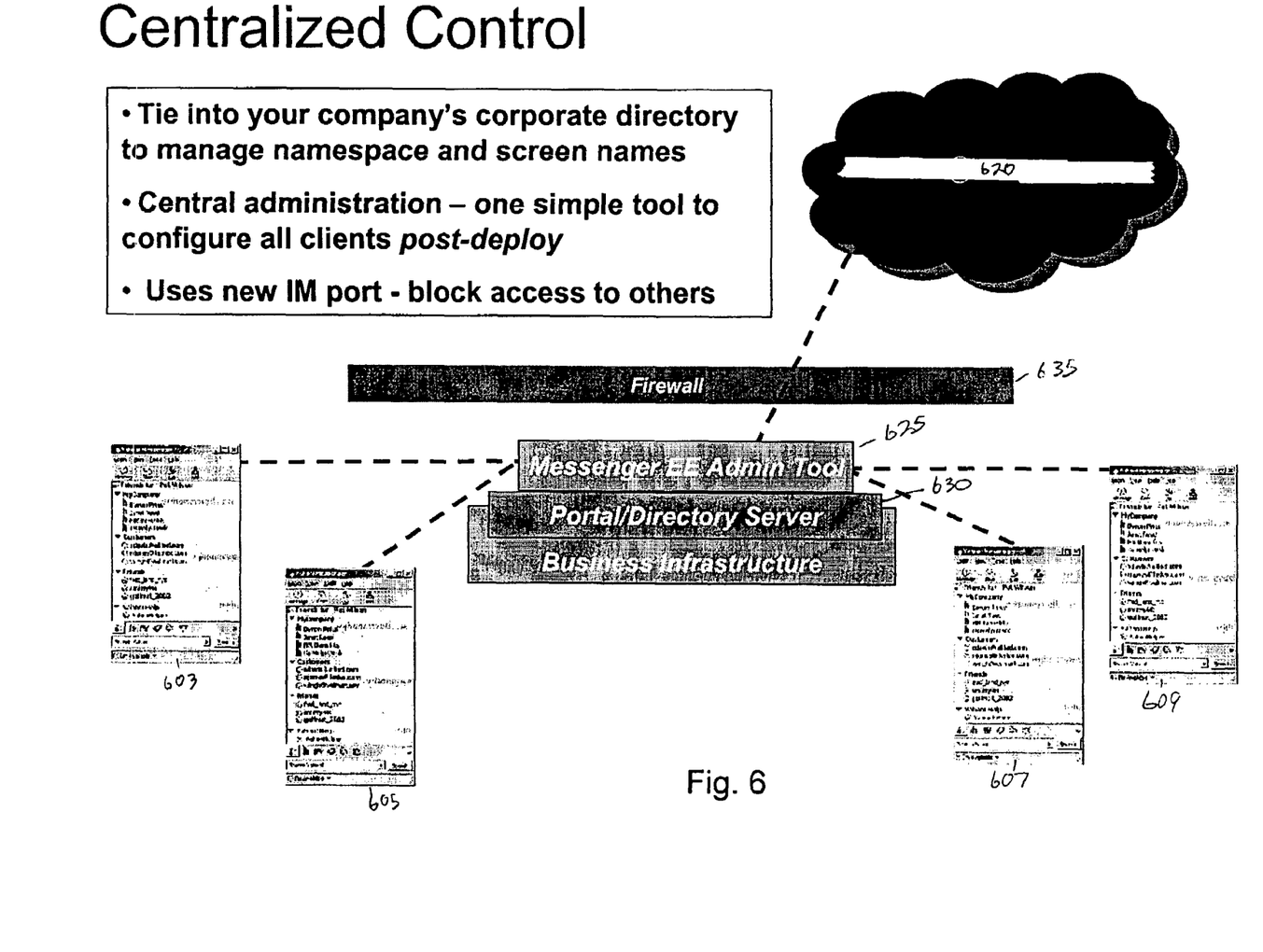
FIG. 6 shows an embodiment of the centralized administration of an enterprise messenger system.

An additional feature of the enterprise messaging system allows an enterprise administrator to centrally configure all of the enterprise messaging clients operating within the enterprise. FIG. 6 illustrates an enterprise messaging system including an enterprise messaging administration tool according to an embodiment of the invention. In this embodiment, an enterprise messaging administration tool 625 communicates with the enterprise' authentication server 630. The authentication server is in communication with messaging clients 603, 605, 607, and 609, which are located behind the enterprise' firewall 635. Additionally, the authentication server 630 is in communication with the service provider 620. The operation of messaging clients, the authentication server, and the service provider is described above.

In an embodiment, the enterprise messaging administation tool 625 creates a configuration file defining the desired configuration of messaging clients in the enterprise. In one embodiment, each messaging client retrieves a copy of the configuration file using an HTTP or HTTPS request each time the client is started. In another embodiment, a messaging client retrieves a copy of the configuration file on each login attempt.

The enterprise messaging administration tool 625 can perform many different administrative functions. For example, an enterprise administrator can add or delete enterprise messaging users. In an embodiment, the authentication server is interfaced with the enterprise's business infrastructure, such as the enterprise's directory service. In this embodiment, changes to users in the directory service can be automatically mirrored in the enterprise messaging system. In another embodiment, the enterprise messaging administration tool 625 can also configuration of each messaging client within the enterprise. The configuration of each messaging client can include selectively enabling or disabling features, for example video messaging. Additional configuration of messaging clients can include setting the visual appearance or theme. This can include changing the colors, fonts, and even an image background for the messaging client.

In a further embodiment, the enterprise messaging administration tool 625 can configure the messaging clients to display additional, enterprise-specific content. In an embodiment, additional enterprise-specific content is accessed via one or more "tabs" added to the messaging client's graphical user interface. When a user selects one of the added tabs, the messaging client displays the addition content in its main window. An example of enterprise-specific content is an enterprise directory. Enterprise messaging users could use the enterprise directory to locate another user by criteria such as name, location, or department. The user could then use the messaging client to contact the other user immediately. Another example of enterprise-specific content is an enterprise news tab to display enterprise news.

In a further embodiment, the enterprise-specific content is presented as an html-formatted web page. The web page is stored on a web server located within the enterprise. When the user selects a tab, the messaging client retrieves and displays the web page. Because this embodiment uses standard HTML formatting, any type of information that can be represented as HTML can be delivered to the messaging clients. In a further embodiment, the web page can be integrated with the enterprise's business infrastructure, so that enterprise-specific content can be maintained or updated with little or no effort. For example, if the messaging client displays an enterprise directory from a web page, a web server application can be interfaced to the enterprise's directory service so that user changes are automatically reflected in the web page.

In yet another embodiment, the enterprise messaging administration tool 625 can configure an archiving server to archive all enterprise messaging activity. In an embodiment, each messaging client sends a duplicate of message sent or received to a URL specified by the enterprise administrator. The archiving server is configured by the enterprise administrator to receive and store copies of all messaging traffic sent to this URL. These can then be archived or reviewed by the enterprise. In a further embodiment, the messaging client can be configured not to operate when the archive URL is unavailable. Alternatively, each messaging client can archive its messaging traffic locally when the archive URL is unavailable. When the connection with the archive URL is restored, messaging clients can upload the locally archived messaging traffic. In yet another embodiment, non-text based messaging traffic, such as file transfers or multimedia messaging, are not archived in order to conserve network resources.

Those skilled in the art will appreciate that the present invention establishes a method for modifying or extending any type of software interface without the need to recompile other dependent software. The present invention has been described in relation to particular embodiments that are intended in all respects to be illustrative rather than restrictive. Therefore, it should be understood that the method and apparatus of the present invention could be practiced with modification and alteration within the spirit and scope of the claims herein. Furthermore, the invention may be implemented in any combination of hardware and/or software. Alternative embodiments will become apparent to those skilled in the art to which the present invention pertains without departing from its spirit and scope.

What is claimed is:

1. An apparatus for providing real-time communication over an electronic communication network between two or more users, the apparatus comprising:
  a messaging service application associated with a client application and a first authentication application for establishing communication among the users, wherein the client application is associated with each user, and the first authentication application is associated with the client application and includes authentication information for at least one user, and
  wherein establishing the communication among the users includes:
    receiving from the first authentication application a token request, the token request being associated with the client application, which is itself associated with a designated user, the designated user having been authenticated;
    sending a token to the first authentication application in response to the token request;
    receiving a connection request from the client application;
    receiving the token from the first authentication application via the client application;
    determining whether the received token is intact; and
    if the received token is intact, establishing communication between the client application and the communication system.

2. The apparatus of claim 1, wherein the first authentication application and the client applications associated with the first authentication application reside on a private network in communication with a public network.

3. The apparatus system of claim 2, wherein the authentication information of the first authentication application is received from an authentication source for at least one user of the private network.

4. The apparatus of claim 2, wherein the messaging service application resides on the public network, and all communication between the first authentication application and the messaging service application passes through a firewall.

5. The apparatus of claim 4, wherein all communication between the first authentication application and the messaging service application is via a secure communications connection.

6. The apparatus of claim 2, wherein the first authentication application includes an administration tool for configuring client applications residing on the private network.

7. The apparatus of claim 6, wherein the administration tool configures the client applications to include a content panel for displaying information.

8. The apparatus of claim 7, wherein the client applications retrieve the information for display by the content panel from a location on the private network specified by the administration tool.

9. The apparatus of claim 1, further comprising a second authentication application associated with at least one of the client applications and having authentication information for at least one user.

10. The apparatus of claim 9, wherein the first authentication application and the client applications associated with the first authentication application reside on a first private network in communication with a public network, and the second authentication application and the client applications associated with the second authentication application reside on a second private network in communication with public network.

11. A method for establishing communication among a client application associated with a designated user and a communication system to provide real-time interactive communications between two or more users, the method comprising:
  receiving from an authentication application a token request, the token request associated with a client application that is itself associated with the designated user, the designated user having been authenticated;
  sending a token to the authentication application in response to the token request;

receiving a connection request from the client application;

receiving the token from the authentication application via the client application;

determining whether the received token is intact; and if the received token is intact, establishing communication between the client application and the communication system.

12. The method of claim 11, wherein sending a token includes encoding a user identification assigned to the authenticated user into the token; and determining includes decoding the received token to extract the user identification.

13. The method of claim 12, wherein sending a token includes encoding a time stamp into the token; and determining includes decoding the received token to extract the time stamp.

14. The method of claim 11, wherein the connection request includes a user identification assigned to the authenticated user.

15. The method of claim 11, wherein sending a token includes randomly generating a token value, associating the token value with a user identification assigned to the authenticated user, and storing the user identification and the token value; and the step of determining includes matching the received token to the stored token value, and matching the user identification included with the connection request to the stored user identification.

16. The method of claim 11, further comprising adding a first user identification assigned to the authenticated user to a list of connected users.

17. The method of claim 16, further comprising retrieving data associated with the first user identification from a list of user data.

18. The method of claim 17, wherein retrieving data associated with the first user identification includes retrieving a contact list of user identifications associated with other users.

19. The method of claim 17, wherein retrieving data associated with the first user identification includes retrieving a reference to a second user identification assigned to the authenticated user, and the method further comprises adding the second user identification to the list of connected users.

20. The method of claim 11, wherein receiving from a authentication application a token request, sending a token, receiving a connection request, receiving the token, and establishing communication each occur over a secure communications connection.

21. An information storage medium including a set of instructions adapted to operate an information processing device for causing performance of a method comprising:

sending to an authentication application an authentication request;

receiving from the authentication application authentication credentials;

sending a connection request to a messaging service application;

receiving a token from a messaging service application via the authentication application;

sending the token to the messaging service application; and establishing a connection with the messaging service application in response to the messaging service application determining that the token is intact.

22. The information storage medium of claim 21, wherein sending a connection request includes sending authentication credentials to the authentication application to be forwarded to the messaging service application with the connection request.

23. The information storage medium of claim 21, wherein receiving a token, sending the token, and establishing a connection each occur at least partially over a secure communications connection.

24. The information storage medium of claim 21, wherein the method further comprises receiving configuration data from the authentication application.

25. The information storage medium of claim 23, wherein the method further comprises retrieving information for display in a content panel from a location specified by the configuration data.

* * * * *